Patented Apr. 10, 1923.

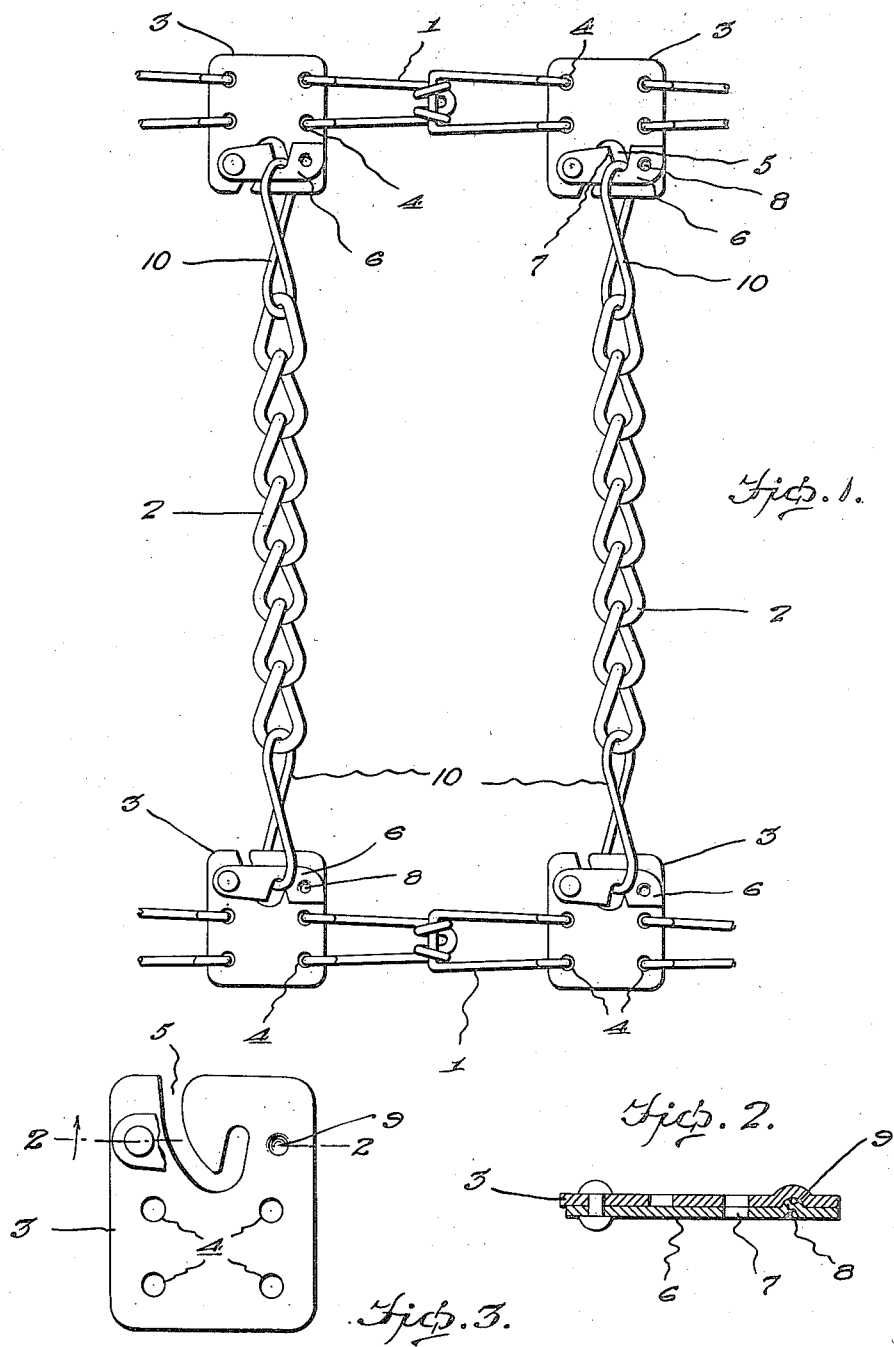

1,450,981

UNITED STATES PATENT OFFICE.

PATRICK McLOUGHLIN, OF WORCESTER, MASSACHUSETTS.

CHAIN.

Application filed April 10, 1922. Serial No. 551,089.

*To all whom it may concern:*

Be it known that I, PATRICK McLOUGHLIN, a subject of the King of Great Britain, residing at Worcester, in the county of Worcester and State of Massachusetts, have invented new and useful Improvements in Chains, of which the following is a specification.

This invention relates to anti-skid chains for motor vehicles, the general object of the invention being to provide means for detachably connecting the cross chains to the holding chains.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of a section of a chain constructed in accordance with my invention.

Figures 2 and 3 are detail views of one of the holding plates, Figure 2 being a section on line 2—2 of Figure 3.

In these views 1 indicates the pair of holding chains which are adapted to extend circumferentially around the tire and 2 indicates the cross chains which are connected with the holding chains and extend across the tire and act to prevent slipping of the tire on the road surface. It is the object of my invention to provide means for connecting these cross chains with the holding chains and, as shown in the drawings, such means consists of a plurality of plates 3 to which the links of chains 1 are connected by having portions of the links passing through holes 4 in said plates. The drawings show a pair of links connecting each pair of plates together, though it will of course be understood that I do not wish to be limited to this arrangement. Each plate is provided with a hook-shaped slot 5 in its inner edge for receiving the end link of the cross chain and the end link is held in place by means of a latch plate 6 which is pivotally connected with each of the plates 3 and has a notch 7 therein for receiving a portion of the end link. This plate 6 is provided with a small projection 8 for engaging a recess 9 in the plate 3 to hold it in closed position.

From the above it will be seen that each cross chain is detachably connected with the holding chains by the plates so that it is a simple matter to remove and replace said cross chains and if desired all the cross chains can be removed from the holding chains in order to facilitate storage of the chains when not in use. I prefer to make the end links of each cross chain of greater length than the rest of the links, as shown at 10.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An anti-skid device comprising a pair of holding chains, cross chains, means for detachably connecting the cross chains with the holding chains, such means comprising a plurality of plates forming portions of the holding chains and having hook-shaped slots therein for receiving the end links of the cross chains.

2. An anti-skid device comprising a pair of holding chains, cross chains, means for detachably connecting the cross chains with the holding chains, such means comprising a plurality of plates forming portions of the holding chains and having hook-shaped slots therein for receiving the end links of the cross chains and latch plates for holding the end links of the cross chains in the slots of the plates.

In testimony whereof I affix my signature.

PATRICK McLOUGHLIN.